United States Patent [19]

Nakajima

[11] Patent Number: 4,937,724
[45] Date of Patent: Jun. 26, 1990

[54] SWITCHING REGULATOR
[75] Inventor: Tadao Nakajima, Yokohama, Japan
[73] Assignee: Victor Company of Japan, Limited, Kanagawa, Japan
[21] Appl. No.: 346,099
[22] Filed: May 2, 1989
[30] Foreign Application Priority Data
  May 16, 1988 [JP] Japan ............................ 63-63390[U]
[51] Int. Cl.$^5$ ...................... H02H 7/122; H02M 3/335
[52] U.S. Cl. ........................................ 363/56; 363/19; 363/49
[58] Field of Search .................... 363/18, 19, 95, 56, 363/49, 131; 323/901

[56] References Cited

U.S. PATENT DOCUMENTS

| | | | |
|---|---|---|---|
| 4,092,710 | 5/1978 | Wadsworth | 363/19 |
| 4,443,838 | 4/1984 | Yamada | 363/19 |
| 4,731,721 | 3/1988 | Igashira et al. | 363/19 |

Primary Examiner—Peter S. Wong
Attorney, Agent, or Firm—Jordan and Hamburg

[57] ABSTRACT

A switching regulator for use with various kinds of electric and electronic equipment as a DC stabilizing power source. The switching regulator has a switching element implemented as an n-p-n switching transistor, an overcurrent detecting circuit for detecting an overcurrent ascribable to a fault, and a start delaying circuit for, after the switching transistor has been caused into an inactive state, feeding to the transistor a starting current which is delayed by a predetermined period of time. When the fault is removed, the switching transistor resumes its turn-on and turn-off operations immediately so as to restore the switching regulator to normal rapidly.

1 Claim, 3 Drawing Sheets

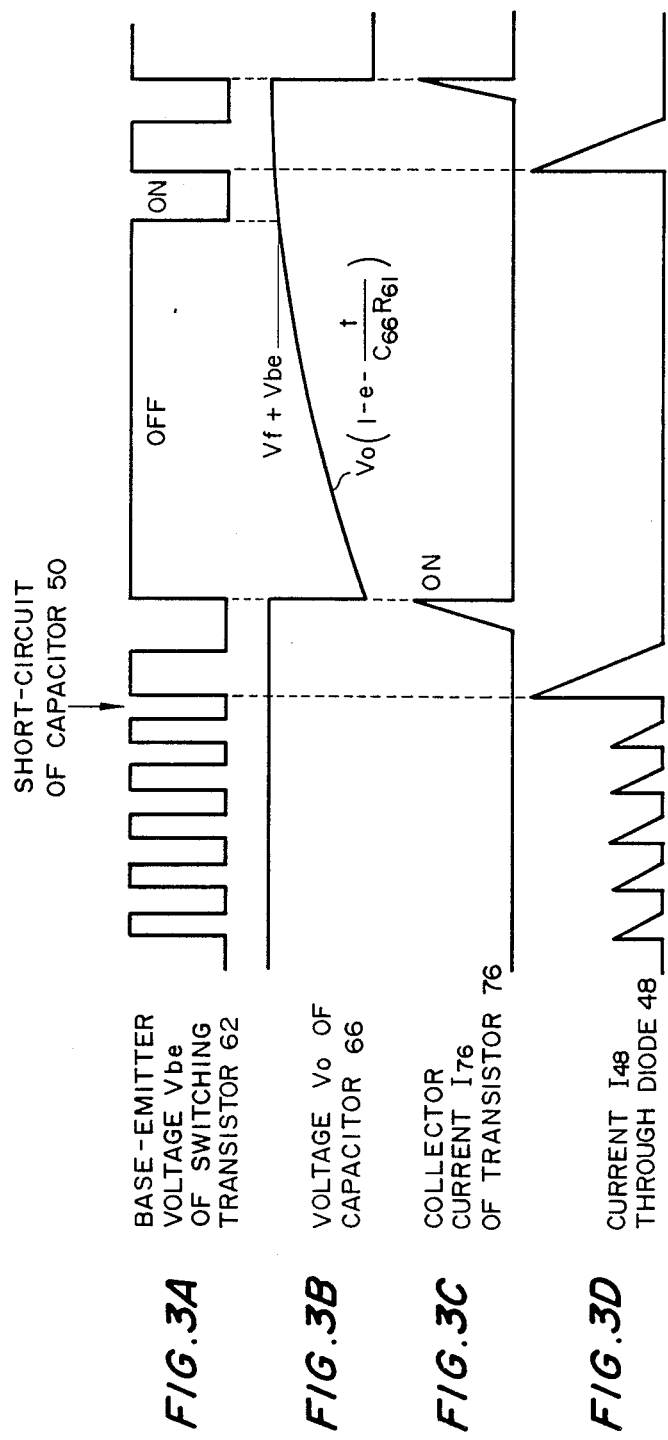

SWITCHING REGULATOR

BACKGROUND OF THE INVENTION

The present invention relates to a switching regulator for use with various kinds of electric and electronic equipment as a DC stabilizing power supply.

A switching regulator is drawing much attention as a stabilizing power supply for feeding a DC voltage and a DC current stably to a load in the form of electric or electronic equipment. While a switching regulator is small size, light weight and highly efficient, it is apt to produce noise and is complicated in construction and therefore expensive. These disadvantages are the obstacle to the extensive application of a switching regulator to common equipment. Further, a switching regulator has to be provided with a circuit for protecting it against an overcurrent which is ascribable to short-circuiting of a load connected to the switching regulator and is apt to cause a fire or damage of electronic components. Such an overcurrent protection circuit is usually constituted by a transistor and a resistor. Besides, a prior art switching regulator is provided with a switching transistor, a starting circuit having a capacitor for starting the switching transistor, an insulating transformer, a rectifying circuit for rectifying a high-frequency voltage which is generated in the secondary winding of the transformer, and output terminals connected to the rectifying circuit for delivering a DC voltage. A load is connected to the output terminals. When this kind of switching regulator is connected to a commercially available power supply, the capacitor of the starting circuit is charged and the charging current is fed to the base of the switching transistor to start the latter. A fly-back voltage is applied from the transformer to the switching transistor so that the switching voltage is generated in the secondary winding of the transformer. The high-frequency voltage is rectified by the rectifying circuit and then delivered to the load in the form of a DC voltage. In the event that a fault such as short-circuiting of the load has occurred, an overcurrent flows through a protection circuit to render a transistor thereof conductive and thereby to bypass the base current of the switching transistor. The switching transistor, therefore, stops oscillating. In this condition, the overcurrent disappears and the capacitor of the starting circuit is brought into a fully charged state. In this manner, the swtiching regulator is protected against damage due to overcurrents.

However, even if the load is restored to normal, the switching regulator having the above construction cannot bring its switching transistor to resume the oscillation immediately. Specifically, despite the absence of the overcurrent, a current is not fed to the base of the switching transistor due to the fully charged state of the capacitor of the starting circuit. The switching transistor cannot oscillating again unless a person once disconnects positively the switching regulator from the commercial AC power supply to discharge the capacitor of the starting circuit and then connects it again to the AC power supply, resulting in troublesome manipulations. Moreover, at the instant when the switching regulator is connected to an AC power supply, there is a chance of rush current which causes the protection circuit malfunctioning and thereby prevent the switching transistor from oscillating.

SUMMARY OF THE INVENTION

It is therefore an object of the present invention to provide a switching regulator having a protection capability against faults and, yet, capable of automatically regaining its normal conditions immediately when a fault is removed.

It is another object of the present invention to provide a cost-saving and simple switching regulator.

It is another object of the present invention to provide a generally improved switching regulator.

A switching regulator for producing a DC voltage in response to an AC voltage which is applied from a commercially available power source of the present invention comprises a first rectifying circuit for rectifying the AC voltage from the power source to produce a rectified DC voltage, a transformer having a primary winding and a secondary winding, a switching element to which the rectified DC voltage is applied from the first rectifying circuit via the primary winding of the transformer, a second rectifying circuit for rectifying a high-frequency voltage which is generated in the secondary winding of the transformer by turn-ons and turn-offs of the switching element, an overcurrent detecting circuit for monitoring a current flowing through the switching element and, upon detecting an overcurrent, interrupting the turn-ons and turn-offs of the switching element to thereby cause the switching element into an inactive state, and a start delaying circuit for delaying, after the switching element has been caused into an inactive state upon connection to the commercially available AC power supply or by the overcurrent detecting circuit, a starting current by a predetermined period of time and feeding the delayed starting current to the switching element.

BRIEF DESCRIPTION OF THE DRAWINGS

The above and other objects, features and advantages of the present invention will become more apparent from the following detailed description taken with the accompanying drawings in which:

FIGS. 3A and 3D are diagrams showing the waveforms of signals which appear in various portions of the switching regulator shown in FIG. 2.

DESCRIPTION OF THE PREFERRED EMBODIMENT

Figure 1:
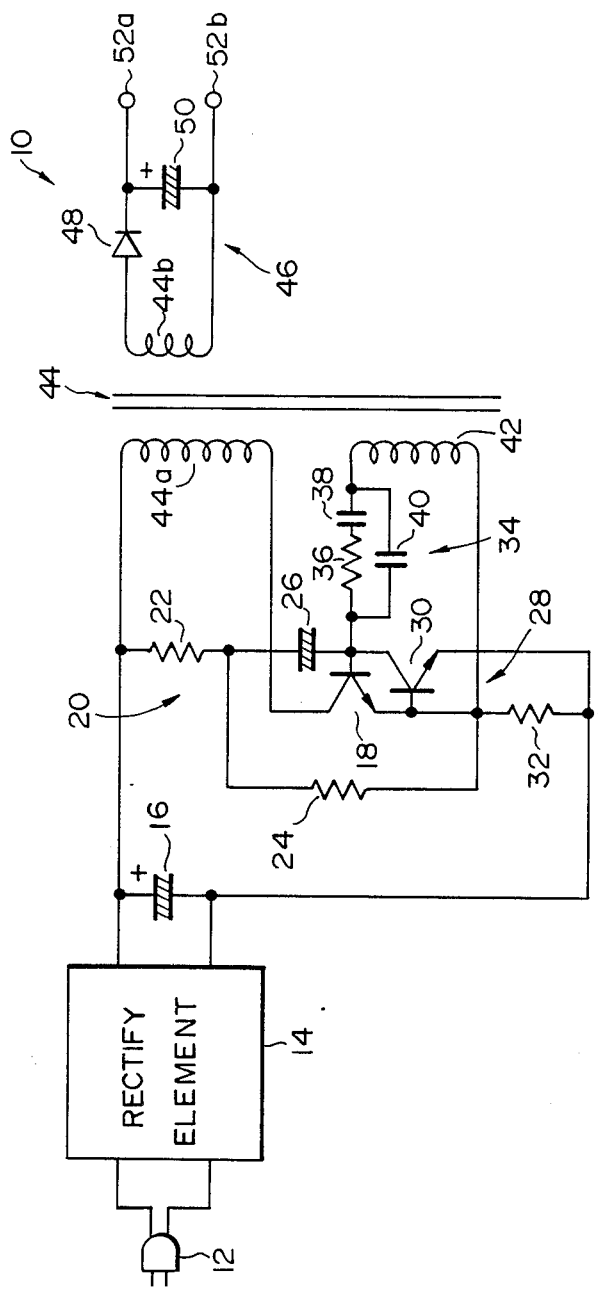
FIG. 1 is a circuit diagram showing a prior art switching regulator.

To better understand the present invention, a brief reference will be made to a prior art switching regulator, generally 10, includes a plug 12 connectable to a commercially available AC power source such as a wall outlet of house application. A rectifying element 14 and a smoothing capacitor 16 cooperate to rectify the AC voltage coming in through the plug 12. An n-p-n switching transistor 18 is started up by a starting circuit 20 which is made up of resistors 22 and 24 and a capacitor 26. A feedback circuit is associated with the switching transistor 18 and constituted by a resistor 36, capacitors 38 and 40, and a winding 42. An insulating transformer 44 has a primary winding 44a and a secondary winding 44b. A rectifying circuit 46 is composed of a diode 48 and a capacitor 50 and serves to rectify a high-frequency voltage which generated in the secondary winding 44b fo the transformer 44. Outputs terminals 52a and 52b are provided to allow a load to be connected to the switching regulator 10. Usually, when the plug 12 is connected to a socket, the capacitor 26 is charged via the resistor 22 and the charging current is fed to the base of the switching transistor 18 resulting in the transistor 18 being started up. Then, the transistor 18 continuously oscillates in response to a fly-back voltage from the insulating transformer 44. Consequently, a high-frequency voltage is developed in the secondary winding 44b of the transformer 44. The rectifying circuit 46 rectifies the high-frequency voltage and delivers the resulting DC voltage via the output terminals 52a and 52b.

Assume that the capacitor 50 of the rectifying circuit 46 or the load connected to the output terminals 52a and 52b has been short-circuited, for example. Then, an overcurrent flows through the overcurrent protection circuit 28 which is constituted by the transistor 30 and resistor 32, as stated earlier. In this condition, the path between the collector and emitter of the transistor 30 is rendered conductive so that the base current of the switching transistor 30 is bypassed by the transistor 30. As a result, the switching transistor 18 stops oscillating so that the overcurrent does not flow any longer. Simultaneously, the capacitor 26 is brought into a fully charged state. In this manner, the switching regualtor 10 itself is protected against the above-described kind of fault.

A problem with the prior art switching regulator 10 is that the switching transistor 18 cannot resume the oscillation immediately when the load is restored to normal. Specifically, since the capacitor 26 is in a fully charged condition, a base current is not fed to the switching transistor 18 despite that an overcurrent is not detected by the overcurrent protection circuit 28 and, therefore, the switching transistor 18 cannot resume the oscillation as mentioned above. To cause the switching transistor 18 to start oscillating again, one has to pull out the plug 12 from the wall outlet to thereby discharge the capacitor 26 and then insert the plug 12 again into the wall outlet that is troublesome.

Figure 2:
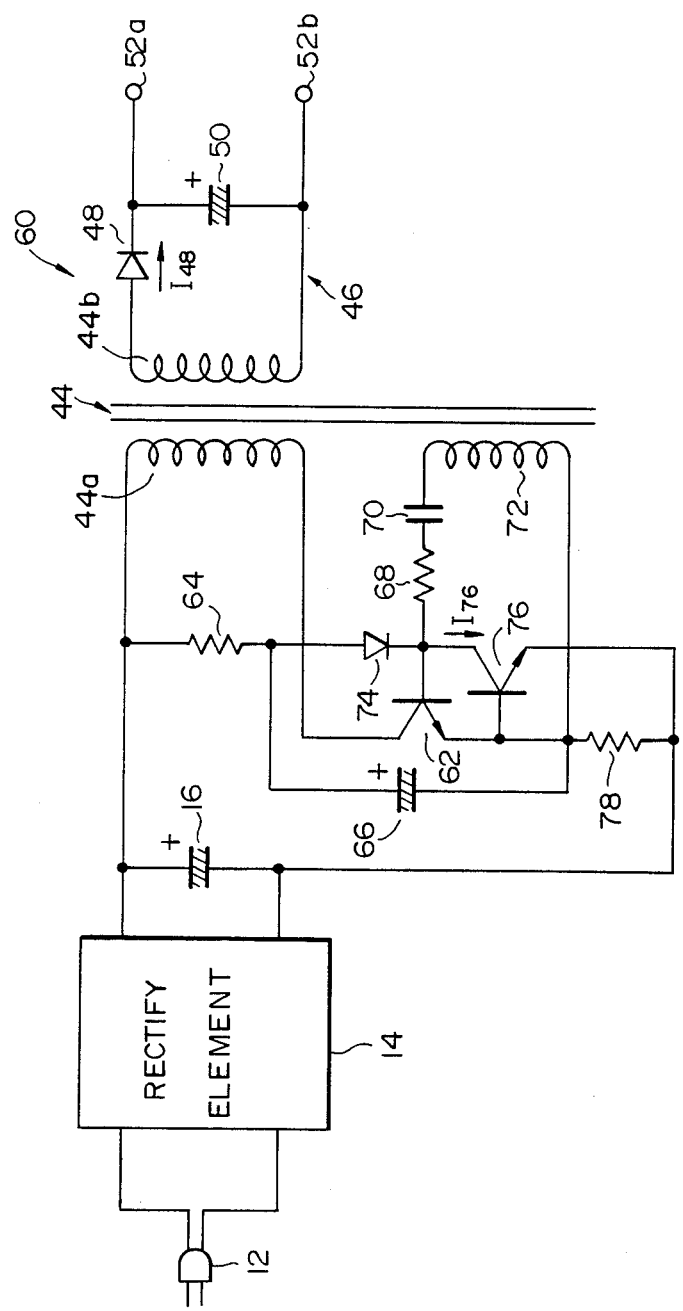
FIG. 2 is a circuit diagram showing a switching regulator embodying the present invention.

Referring to FIG. 2, a switching regulator embodying the present invention is shown and generally designated by the reference numeral 60. In FIG. 2, the same or similar structural elements as those shown in FIG. 1 are designated by like reference numerals. As shown, the switching regulator 60 has a plug 12 connected to a capacitor 16 via a rectifying element 14. The rectifying element 14 and capacitor 16 constitute a first rectifying circuit in cooperation. An n-p-n switching transistor 62 has a collector to which the positive terminal of the capacitor 16 is connected via a primary winding 44a of an insulating transformer 44. The positive terminal of the capacitor 16 is also connected to the emitter of the switching transistor 62 via a series connection of a resistor 64 and a capacitor 66. The base of the switching transistor 62 is connected to the emitter of the transistor 62 via a series connection of a resistor 68, a capacitor 70 and a winding 72 of the insulating transformer 44. A diode 74 is connected between the junction of the resistor 64 and capacitor 66 and the base of the switching transistor 62. The diode 74, capacitor 66 and resistor 64 constitute in combination a start delaying circuit which is a characteristic feature of the illustrative embodiment. The resistor 68, capacitor 70 and the winding 72 in combination play the role of a feedback circuit which is associated with the switching transistor 62.

An n-p-n transistor 76 has a collector connected to the base of the transistor 62, a base connected to the emitter of the transistor 62 as well as to one end of a resistor 78, and an emitter connected to the other end of the resistor 78 as well as to the negative terminal of the capacitor 16. The transistors 76 and the resistor 78 cooperate to serve as an overcurrent detecting circuit. Connected to the secondary winding 44b of the insulating transformer 44 are a diode 48 and a capacitor 50 which are adapted to rectify a high-frequency voltage. More specifically, the diode 48 and capacitor 50 constitute a second rectifying circuit in cooperation. A stable DC voltage is fed out via output terminals 52a and 52b.

In operation, when the plug 12 of the switching regulator 60 is connected to a wall outlet, i.e., a commercially available power source, a charging current flows through the capacitor 66 via the resistor 64. As soon as the potential of the capacitor 66 becomes higher than the sum of the base-emitter voltage (base-emitter potential difference) Vbe of the transistor 62 and the forward voltage drop Vf of the diode 74, the transistor 62 starts oscillating. As a result, a high-frequency voltage is generated in the secondary winding 44b of the insulating transformer 44. The high-frequency voltage is rectified by the diode 48 and capacitor 50, so that a stable DC voltage is delivered via the output terminals 52a and 52b.

The operation of the switching regulator 60 in the event of a fault will be described under the condition of the short-circuiting of the capacitor 50 as an example. The short-circuiting of the capacitor 50 causes a current I48 through the diode 48 to sharply increase (FIG. 3D). As a result, the collector current of the transistor 62 and therefore the potential across the resistor 78 is increased when the transistor 62 becomes conductive at the subsequent "ON" switching cycle to the shortcutting. This causes the transistor 76 conductive (FIG. 3C) while forcibly turning off the transistor 62 (FIG. 3A), whereby the capacitor 66 releases the charge stored therein (FIG. 3B). Thereafter, the transistor 62 is not rendered conductive until the potential of the capacitor 66 becomes Vf+Vbe due to a time constant which is determined by the resistor 64 and capacitor 66. As the potential of the capacitor 66 reaches Vf+Vb, the switching transistor 62 is turned on for a moment. However, so long as the capacitor 50 remains short-circuited, the switching transistor 62 is again turned off by the above-stated process and therefore does not resume the oscillation. In this condition, hardly any overcurrent due to the short circuit flows through the capacitor 50 and, hence, safety operation is insured despite the fault.

If the capacitor 50 is stored to normal, the switching regulator 60 will regain its normal operating conditions immediately when the potential of the capacitor 66 is increased above VF+Vbe. This is of course accomplished without resorting to troublesome manipulations otherwise imposed on a person for pulling out the plug 12 from the wall outlet and then re-inserting it again into the outlet.

Assume that the overcurrent detecting circuit has malfunctioned due to the rush current which often occurs momentarily at the start-up of the switching regulator 60 as mentioned earlier. Even in this condition, the switching regulatory 60 allows the switching transistor 62 to automatically start oscillating upon the lapse of a predetermined period of time which is determined by the time constant of the resistor 64 and capacitor 66.

In summary, it will be seen that the present invention provides a switching regulator having various advantages as enumerated below:

(1) Even if a switching element is forcibly deactivated by an overcurrent detecting circuit, it can resume its operation immediately when a fault has been removed and, hence, the switching regulator is rapidly restored to normal to serve as a DC power supply circuit;

(2) Although the overcurrent detecting circuit may malfunction at the usual start-up (upon the supply of a commercial AC voltage), the switching regulator outputs a DC voltage by itself as a DC power supply circuit; and (3) The circuit construction is simple and therefore cost-saving.

Various modifications will become possible for those skilled in the art after receiving the teachings of the present disclosure without departing from the scope thereof.

What is claimed is:

1. A switching regulator for producing a DC voltage in response to an AC voltage which is applied from a commercially available power source, comprising:

first rectifying means comprising a rectifying element and a first capacitor for rectifying the AC voltage from said power source to produce a rectified DC voltage;

a transformer having a primary winding and a secondary winding;

switching means comprising a switching transistor to which the rectified DC voltage is applied from said first rectifying means via said primary winding of said transformer;

second rectifying means for rectifying a high-frequency voltage which is generated in said secondary winding of said transformer by turn-ons and turn-offs of said switching means;

overcurrent detecting means for monitoring a current flowing through said switching means and, upon detecting an overcurrent, interrupting the turn-ons and turn-offs of said switching means to thereby cause said switching means into an inactive state; and start delaying means for delaying, after said switching means has been caused into an inactive state upon connection to said commercially available AC power supply or by said overcurrent detecting means, a starting current by a predetermined period of time and feeding the delayed starting current to said switching means, said start delaying means comprising a series connection of a resistor and a second capacitor connected between a positive terminal of said first capacitor of said first rectifying means and an emitter of said switching transistor, and a diode connected between a junction of said resistor and said second capacitor and a base of said switching transistor.

* * * * *